J. C. JOHNSON.
Improvement in Tool for Paring Horses Hoofs.
No. 132,010.
Patented Oct. 8, 1872.
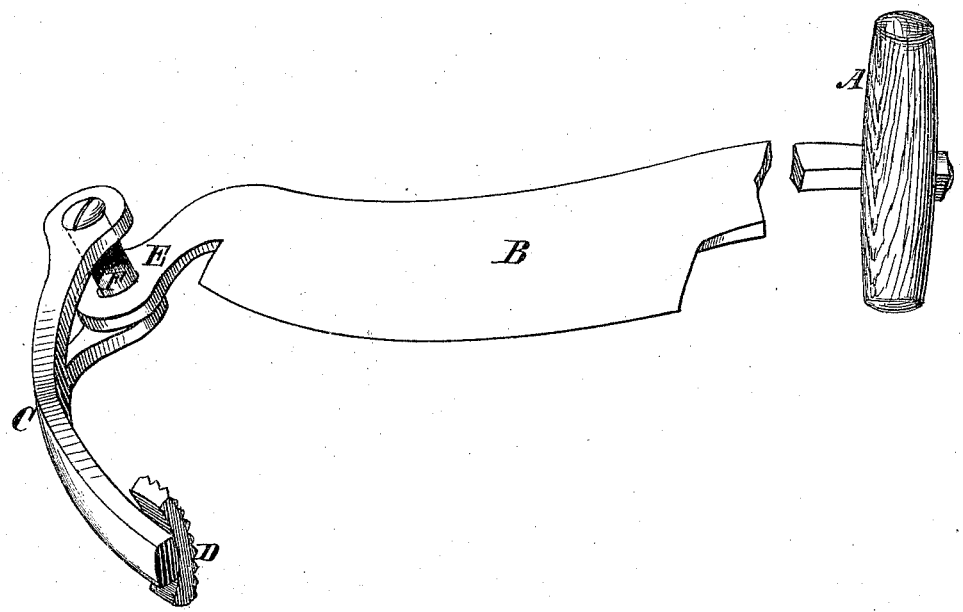
Witnesses:
John Becker
C. Sedgwick
Inventor:
J. C. Johnson
Per Munn & Co
Attorneys.

UNITED STATES PATENT OFFICE.

JOHN C. JOHNSON, OF SULPHUR SPRINGS, INDIANA.

IMPROVEMENT IN TOOLS FOR PARING HORSES' HOOFS.

Specification forming part of Letters Patent No. 132,010, dated October 8, 1872.

*To all whom it may concern:*

Be it known that I, JOHN C. JOHNSON, of Sulphur Springs, in the county of Henry and State of Indiana, have invented a new and useful Improvement in Tools for Paring Horses' Hoofs, of which the following is a specification:

This invention relates to a new and improved instrument for trimming the hoofs of horses preparatory to shoeing; and consists in a combined knife and clamp, constructed and arranged as hereinafter described.

The accompanying drawing is a view of the instrument.

A is the handle; B is the blade; and C is the clamp-bar. The clamp-bar has upon its end a serrated or toothed clamp-block, D, which is held to the hoof with one hand, while the knife is operated with the other hand in paring the hoof. The clamp is attached to the shank E of the blade by the bolt F. The end of the clamp-bar C is forked, as seen in the drawing, so that the shank of the blade has play up and down on the bolt, and the bolt-hole through the shank is somewhat larger than the bolt, so that the blade may be raised in position, as the case may require.

The operation of trimming or paring horses' hoofs for shoeing has heretofore been performed with the well-known instrument called a "butteris;" but paring the hoof with this instrument requires a good deal of strength as well as of time.

With my improved instrument the operation is easy, and is performed in much less time than by the old method. The teeth in the block D, at the end of the clamp-bar, prevent the clamp from slipping when it is held to the hoof. The blade is made to use with either hand, and can be changed from one to the other, as may be required. As the hoof is held by the smith for trimming or paring, the toe is down or from the smith, and the clamp is held to the hoof with one hand, so that it cannot slip while the other hand grasps the handle and operates the knife.

I am aware that a clamp combined with a knife for paring horses' hoofs is not broadly new, but in order to adapt it to use on both sides of hoof, the one known is provided with a double-edged blade, and is reversible to enable it to cut right and left, while I use different means to enable mine to cut right or left.

Therefore, what I claim as my invention is—

A single-edged hoof-parer, provided with the T-handle A, whereby a right or left cut may be easily and conveniently made with the single-edged cutter.

JOHN C. JOHNSON.

Witnesses:
J. H. THOMPSON,
J. V. SCOTT.